(12) United States Patent
Katzur

(10) Patent No.: US 6,839,540 B1
(45) Date of Patent: Jan. 4, 2005

(54) POWER SAVING METHOD FOR MULTIPLE CHANNELS PER CARRIER (MCPC) SATELLITE TRANSMISSION

(75) Inventor: Ran Katzur, North Potomac, MD (US)

(73) Assignee: Hughes Electronics Corporation, El Segundo, CA (US)

(*) Notice: Subject to any disclaimer, the term of this patent is extended or adjusted under 35 U.S.C. 154(b) by 996 days.

(21) Appl. No.: 09/639,457

(22) Filed: Aug. 15, 2000

Related U.S. Application Data
(60) Provisional application No. 60/185,403, filed on Feb. 28, 2000.

(51) Int. Cl.[7] .............................................. H04B 7/185
(52) U.S. Cl. .................................... 455/13.4; 455/127.5
(58) Field of Search ............................... 455/13.4, 12.1, 455/11.1, 427, 428, 522, 127.1, 127.5, 69, 70, 343.1, 79, 563, 426.1, 422.1; 379/392.01, 392, 388.04, 88.1, 406.04, 406.07, 406.01, 406.16; 370/465, 321, 337, 347, 442

(56) References Cited

U.S. PATENT DOCUMENTS
4,357,700 A * 11/1982 Alvarez et al. ............. 370/321
6,714,522 B1 * 3/2004 Lee ........................... 455/13.4

* cited by examiner

*Primary Examiner*—David Hudspeth
*Assistant Examiner*—Eliseo Ramos-Feliciano
(74) *Attorney, Agent, or Firm*—John T. Whelan

(57) ABSTRACT

A method and system which may achieve significantly higher power efficiency for multiple calls from multiple channels in satellite telephony systems. The method and system manipulate the transmission of all channels in a link, (i.e., those channels that are silent as well as those channels that are active) in order to achieve the desired result. The method and system analyze the relationship between power savings for the satellite and system delay to achieve a desired power efficiency without degrading channel quality due to additional delay.

21 Claims, 7 Drawing Sheets

Fig. 7(a)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|
| 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 |
| T | S | S | S | S | T | T | T | T | S | S | S | S | T | T | T | T | S | S | S | S | T | T | T | T |

Fig. 7(b)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|
| 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | X | X | X |
| T | T | S | S | S | S | T | T | T | T | T | T | T | T | S | S | S | S | T | T | T | T | T | T | T | T | S | S | S | S |

Fig. 7(c)

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|
| 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | X | X |
| T | T | T | S | S | S | S | T | T | T | T | T | T | T | T | T | T | T | T | S | S | S | S | T | T | T |

…

POWER SAVING METHOD FOR MULTIPLE CHANNELS PER CARRIER (MCPC) SATELLITE TRANSMISSION

This application claims the benefit under 35 U.S.C. Section 119(e) of a U.S. Provisional application by Ran Katzur, entitled "OPTIMIZED POWER SAVING ALGORITHM FOR AGGREGATED CHANNELS PER CARRIERS (ACPC) SATELLITE TRANSMISSION", Ser. No. 60/185,403, filed on Feb. 28, 2000, the entire contents of which is incorporated by reference herein.

BACKGROUND OF THE INVENTION

1. Technical Field of the Invention

This invention generally relates to satellite telephony applications. More particularly, the invention relates to a method for increasing efficiency in satellite telephony systems so as to enhance power savings at the satellite during multiple channels per carrier (MCPC) satellite transmissions.

2. Description of Related Art

FIG. 1 illustrates a block diagram of a satellite telephony system 100 used for conventionally-known voice activated transmissions such as MCPC, VAD, VOX and VP transmissions. The system 100 comprises an air or space-borne satellite 110 which is in communication with a plurality of telephone subscribers or users 120, via satellite links 125 to/from antennas 130 and radio units 135 corresponding to each of the users 120. The satellite 110 also has transceiver or radio circuitry, and both the satellite 110 and the radio units 135 are able to perform transmission, reception, modulation and demodulation functions for bursts of packets (frame data) transmitted therebetween.

In conventional satellite telephony applications, a known power saving method is based on the fact that a telephone user speaks, on average, less than 50% of the time. During the silence time between speaking, the system 100 ceases transmission of background noise. The individual radio units 135 locally generate the background noise, so that background noise data is not transferred using the satellite link 125. This results in a substantial saving of the satellite's 110 power and energy, which is important since the satellite 110 is generally the limiting component in the satellite telephony system 100. This is because the satellite 110 has a limited amount of power which is driven from sun cells, power which is required to be used for all transmissions through the satellite 110.

This current method is quite efficient for a single telephone call, but degrades in situations where there is more then one call. To understand this more clearly, current single and multiple user efficiency models, as applied to satellite telephony applications, are briefly explained below.

(a) Single User Efficiency.

In telephony systems, the theoretical efficiency for a single user is about 50%. A typical user listens and does not speak more than 50% of the conversation. For satellite telephony systems, the actual efficiency depends on the voice activity implementation, as well as the user's speech pattern.

Transmit power can be an acute problem for satellite 110. One way to save satellite power is to reduce the power consumption of the remote systems on the ground that are taxing the satellite 110. This may be accomplished using a voice activated detection (hereinafter VAD) algorithm. For example, let T be a silence time (also called in-active time) in which a user does not speak. Within the satellite telephony system 100, implementation of a VAD algorithm stops RF transmission during the silence time, and resumes RF transmission as soon as the user starts to speak. If τ1 is the transmission time that is required in order to start a transmission burst (preamble time), and if τ2 is the transmission time needed to stop a transmission burst (postamble time), then in a conventional VAD algorithm, the efficiency (E) of a voice detect (VD) operation is given by:

$$E = \frac{(T - \tau 1 - \tau 2)}{T}, \text{ if } T > (\tau 1 + \tau 2); \text{ or} \qquad (1)$$

$$E = 0, \text{ if } T \leq (\tau 1 + \tau 2).$$

Accordingly, use of the current VAD algorithm causes additional delay to the system. For example, assume g, called the gap, is the minimal delay between the end of one burst and the beginning of a second burst. The gap represents the time required for transmission, reception, modulation and demodulation operations to be performed between bursts. The delay (D) that is added to the satellite telephony system 100 is given by the following expressions:

$$D = \tau 1, \text{ if } T > (\tau 2 + g); \text{ or}$$

$$D = \tau 1 + \tau 2 + g + T, \text{ if } T \leq (\tau 2 + g). \qquad (2)$$

Both sets of equations (1) and (2) therefore suggest that VAD benefits are increased as T increases, and that the satellite telephony system 100 is better off avoiding the performing of VAD operations (note the greater delay D) if T is too small.

Current VAD algorithms also use what is called "hung-over time" to increase the average length of T. Hung-over time is a time that the VAD algorithm will wait (a considerable length of non-active time) before declaring silence. These algorithms that utilize hung-over time assume that the distribution function of T for an average telephone represents two assumptions regarding silence time. The first is that silence during speech bursts last only sub-seconds. An example of silence during speech burst might be silence between sentences. The second assumption is that silence time is present when the speaker listens to the other side's conversation. This silence interval may last seconds up to even several minutes. Although in reality there are more short (sub seconds) silence intervals than long silence intervals, most of the short silence intervals last only milliseconds.

The use of hung-over time therefore prevents the VAD algorithm from declaring silence for the first η milliseconds, (usually between 100–200 milliseconds). Thus, short pauses during speech burst will not trigger termination of the transmission burst. Since this increases the probability that only a burst having a long silence period will be terminated, it follows that VAD efficiency E will increase, with a corresponding decrease in the average delay D.

(b) Multiple-Users efficiency.

The multiple user model is different from the single user model. The combined silence time is the product of an AND operation of all the active users silence time. Accordingly, the characteristics of this combined silence time is different from the single user case. Namely, the silence probability $P_{Single}=0.5$ (50%) for a single user changes to $P_{Multiple}=0.5^N$, where N is the number of users (channels) in the system. Moreover, in the multiple user model, the long silence intervals present when a speaker is listening break into segments of shorter silence periods-this reduces the efficiency of the VAD algorithm even further.

For an exemplary case where there are four channels (users), the probability of silence is $P_{Multiple}=0.5^4$ or about 6% or less. Thus, for multiple transmission of multiple channels (MCPC transmissions), use of the current VAD algorithm described above does not save any significant power. Particularly, the cost of stopping transmission is too high, since the necessity of maintaining the broadcast outweighs any power savings (negligible in the multiple user case) to the satellite. Moreover, no thought has been given regarding a way to save the satellite's transmit power to begin with, even though it is readily recognized that the satellite's transmit power is a limiting feature in satellite telephony applications.

Therefore, what is desired is a method which addresses the aforementioned limitations in current VAD algorithms regarding aggregated or multiple channels, which provides a power saving algorithm resulting in greater average power efficiency, so as to conserve the satellite's power consumption.

SUMMARY OF THE INVENTION

The present invention provides a method and system that may achieve significantly higher power efficiency for satellite telephony systems handling multiple calls from multiple channels. The method manipulates the transmission of all channels in a link, (i.e., those channels which are silent as well as those channels which are active) in order to achieve the desired result. In one embodiment, the method analyzes the relationship between power savings and delay to obtain the desired power efficiency without degrading channel quality due to additional system delay.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(a) to 7(c) illustrate an exemplary implementation of the method for three specific cases in accordance with the invention.

DETAILED DESCRIPTION

Figure 1:
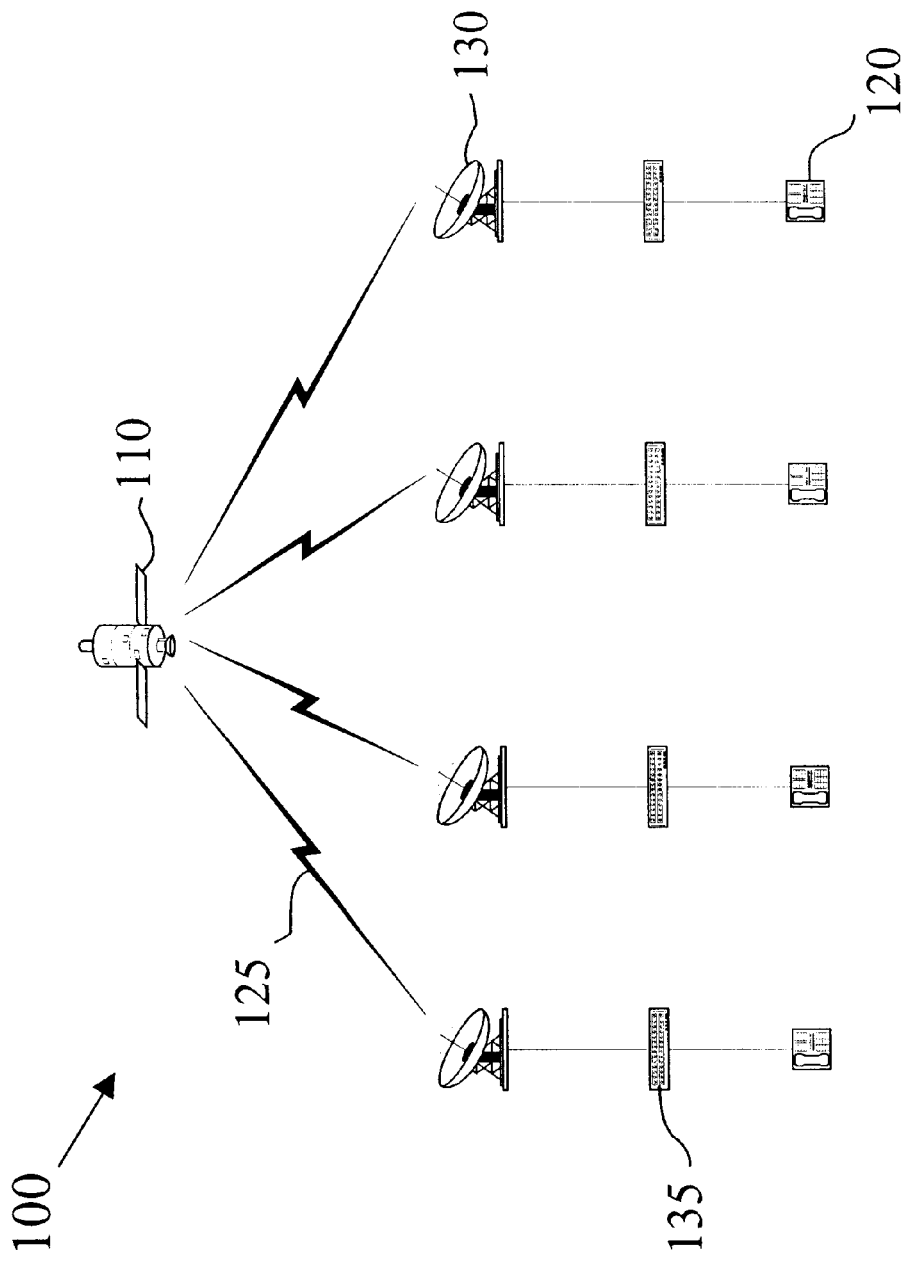
FIG. 1 illustrates a block diagram of a conventional satellite telephony system.

The power saving VAD method of the present invention is for multiple transmission of multiple channels per carrier (MCPC transmissions) transmitted together on a single frequency. This method utilizes pre-defined delay techniques to increase an average power saving efficiency, $E_{VAD}$, for multiple channels in a satellite telephony system from the current achievable efficiency of about 6%, to an $E_{VAD}$ in upwards of about 40%.

The method may apply to a multiple user system which is a frame-based system, i.e., frames of data make up the packets that are transmitted in transmission bursts between satellite and a user's channel. Each frame contains a header and a payload. The header may specify the channel identification number, type of information transmitted (voice, message, etc.) and synchronization marker, for example. The payload is the digital representation of information such as compressed speech or other voice and message information that the satellite telephony system sends. Each frame represents voice data that is collected in a frame-time (milliseconds). The number of bits in a frame is a function of this frame-time, and also of the type of compression. As an example, for a frame-time of $F_t$ milliseconds and a compression ratio of 1:R, the number of bits ($B_0$) in a single frame is equal to:

$$B_0 = \left(\frac{Ft*64}{R+H}\right), \quad (3)$$

where H is the number of header bits for each frame. For N users (channels) the total number of bits (B) that are transmitted, if no VAD mechanism is used, is:

$$B = N*\left(\frac{Ft*64}{R+H}\right). \quad (4)$$

Additionally, the bandwidth of the radio link ($B_r$) between user channel and satellite must satisfy the relationship:

$$B_r \geq B. \quad (5)$$

Many current satellite telephony systems are configured such that $B_r > B$. This enables the system to transfer other informational messages in addition to the voice information, without losing any voice information. In-band message frames are randomly sent, however these in-band frame are sent only sporadically. Thus, it is common that the rate of data coming out of the satellite system is greater than what the system actually generates. In such a case, the system will transmit a dummy frame without any information. This dummy frame can be viewed as a placeholder until an actual frame (frame with speech or voice data therein) is ready for transmission.

If the VAD method determines that a frame is an inactive frame, this frame is treated somewhat similar to a dummy frame, in the sense that "not transmitting" the frame will not degrade or adversely affect the quality of the link. It is in this failure (or success) to transmit such frames (dummy and/or inactive) where possible power savings may be found.

For example, assume that $T_t$ is the transmission time required for a single frame to be transmitted by the satellite/radio unit. Then:

$$T_t = \left(\frac{F_t}{N}\right)*\left(\frac{B}{B_r}\right), \quad (6)$$

where $F_t$ is the frame-time (i.e., the time needed to collect the voice samples necessary to generate one frame) and N is the number of channels. Note that since $B_r$ is in most cases substantially equal to B, this means that the value of $T_t$ is substantially equal to $F_t/N$. Thus to simplify the analysis, it can be assumed that $T_t = F_t/N$.

Recalling equations (1) and (2) above, it is clear that stopping the transmission of a single frame will not save power in the satellite, and can possibly increase the system delay D. However, if there was a way to ensure that transmission would be stopped only in those cases when there are "K" consecutive dummy or inactive frames, then there would be the potential for increasing the power saving in the satellite. The value of K would in turn depend on the features and characteristics of the transmitting and receiving components.

Accordingly, the VAD power saving method of the invention suggests a way to control the transmission such that, in any case dummy and/or inactive frames are not transmitted, so that the interval time, $T_{min}$, for which no transmission occurs will be at least:

$$T_{min} = K * \left(\frac{F_t}{N}\right). \quad (7)$$

The cost of this power saving method in turn would be an increase in system delay. As will be seen, the power saving method of the present invention accounts for this in the analysis discussed in greater detail below.

Figure 2:
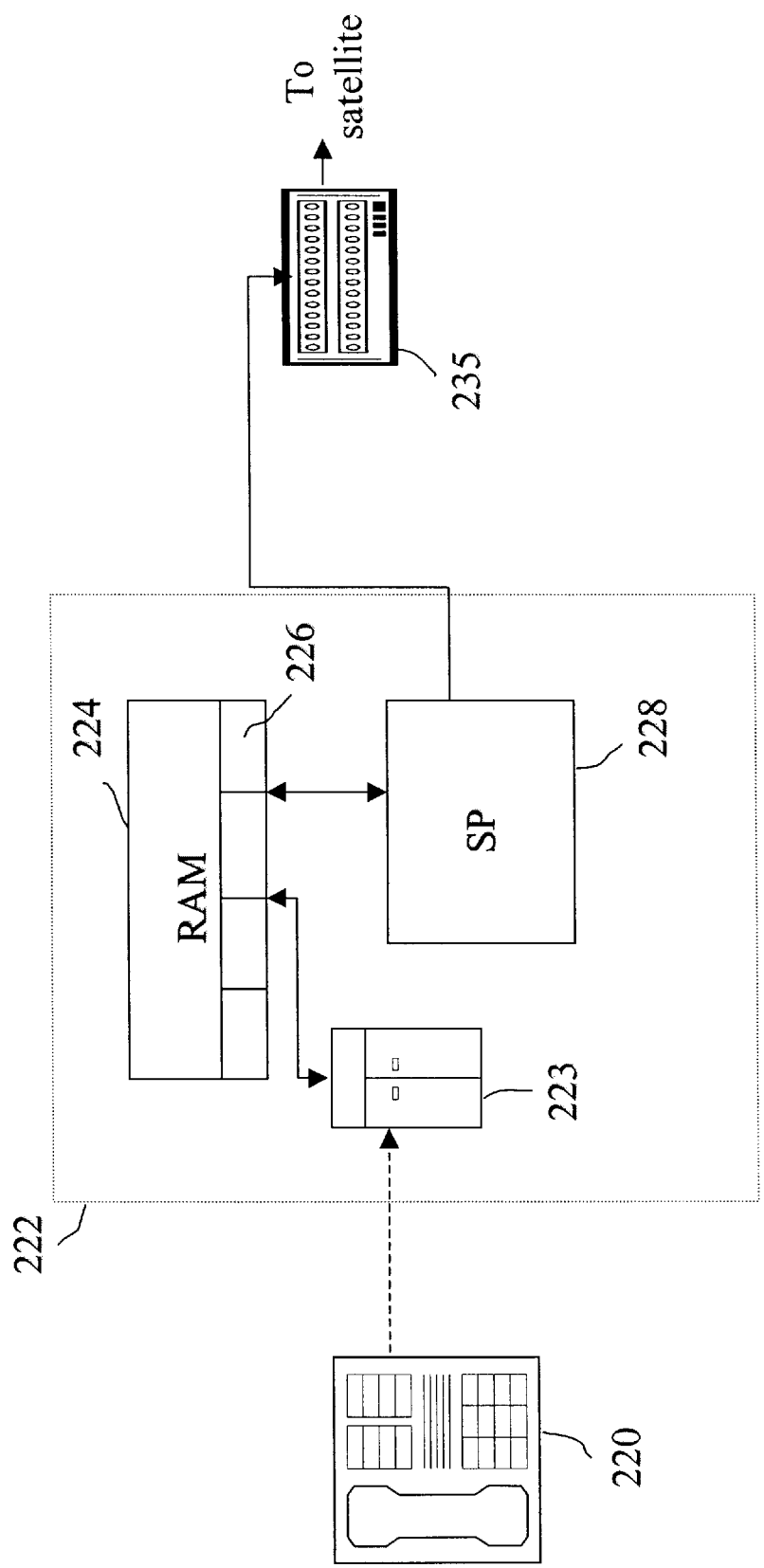
FIG. 2 illustrates a block diagram of the processing circuitry between a remote system and satellite.

FIG. 2 illustrates a block diagram of the processing circuitry between a remote system and the satellite. In FIG. 2, the telephone 220 (i.e., remote system) is connected to a digital signal processor (DSP) 222, which is in turn connected to radio unit 235. Radio unit 235, which is preferably an outdoor unit, communicates with a satellite 250 via an antenna 240, more specifically over a link 245 (as illustrated in FIG. 3).

DSP 222 preferably includes a vocoder 223 (voice compression/decompression processor) and RAM 224. The vocoder 223 is a logic processor which executes compression-decompression algorithms for the received speech/voice data, and may also execute other voice processing algorithms. RAM 224 may be integrated within the DSP 222, or may be a separate unit which is connected to and controlled by DSP 222. The type of RAM may be an SDRAM buffer, an EDO (Extended Data Output) DRAM buffer or any other memory configuration which is known in the art.

Within the RAM 224 of DSP 222 resides a transmit buffer 226; however, this transmit buffer may also be an external memory that is not integral with, but is controlled by DSP 222. Transmit buffer 226 temporarily stores the frames which are to be subject to the VAD algorithm within DSP 222, and which are thereafter transmitted by radio unit 235 to satellite 250 via antenna 240 and link 245. Particularly, DSP 222 controls a send procedure (SP) 228 which empties the frames from transmit buffer 226, based on the power saving VAD algorithm which is the subject of this invention, and which is also controlled by DSP 222.

Figure 3:
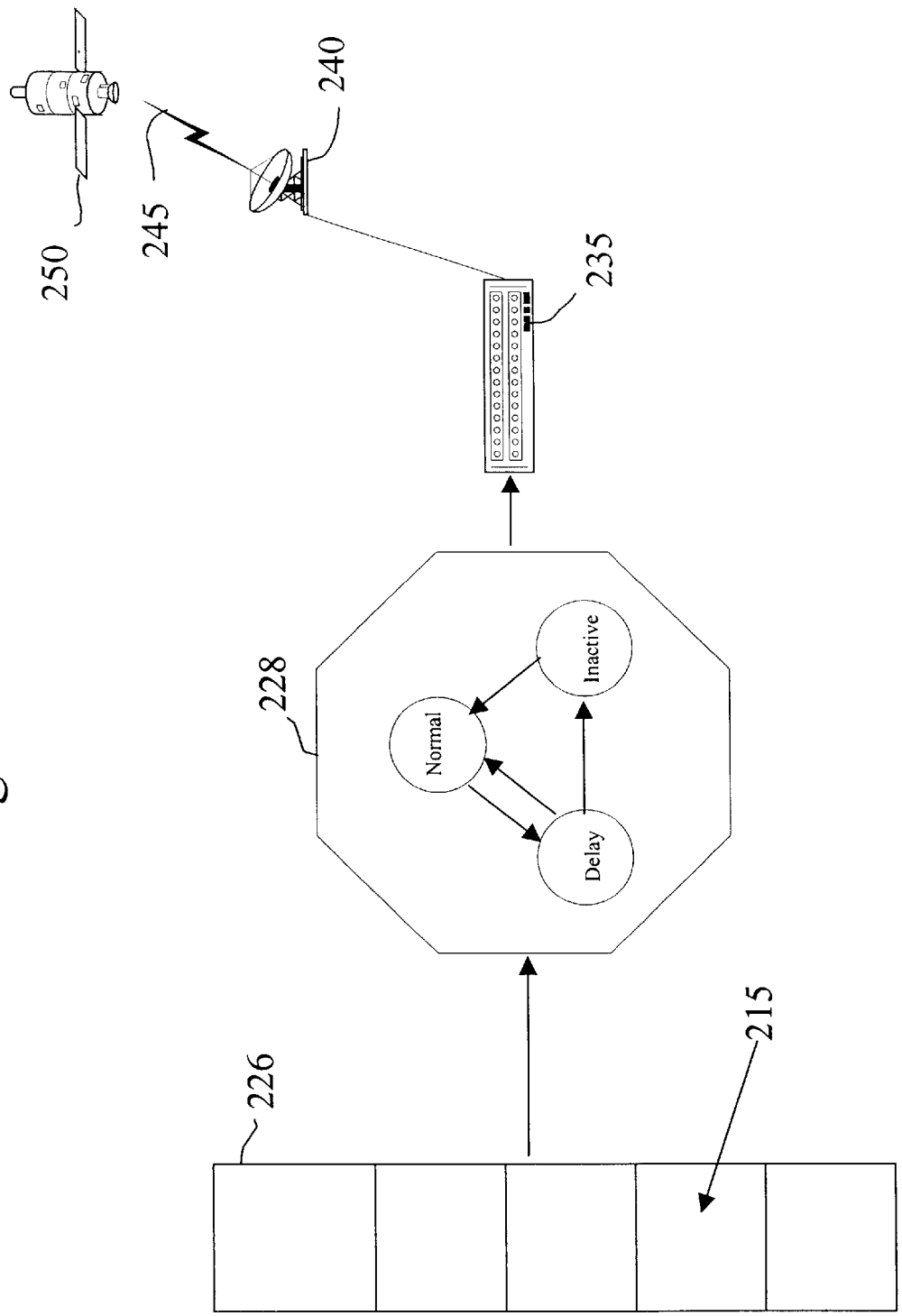
FIG. 3 illustrates signal flow between a transmit buffer, send procedure (SP), and radio unit in accordance with the invention.

FIG. 3 illustrates the signal flow from the transmit buffer 226 to SP 228, to where the selected frame is sent to the radio unit 235 for transmission by antenna 240 via satellite link 245 to the satellite 250. Antenna 240, although shown here as a satellite dish, may also be embodied on a radio tower or any other antenna configuration that is readily known in the art.

Referring to FIG. 3, each user generates a voice frame every 20 milliseconds ($F_t$=20 msec). An energy-frequency VAD algorithm is applied to voice samples of each channel independently from one another. It is termed "energy-frequency" because the algorithm determines whether a particular channel is silent based on whether the energy of the received voice samples is low (about −50 dbm) and whether the frequency distribution of the samples are in the broadband (i.e., many frequencies). Each channel processing generates an output if the VAD algorithm determines that the frame is active. The channel processing writes the output frames 215 into the transmit buffer 226.

The separate Send Procedure (SP) 228 empties the transmit buffer 226 by sending an entire frame 215 toward the radio unit 235 of the user, which in turn transmits frame 215 to the satellite link 245. SP 228 has three states: NORMAL, DELAY and INACTIVE.

Figure 4:
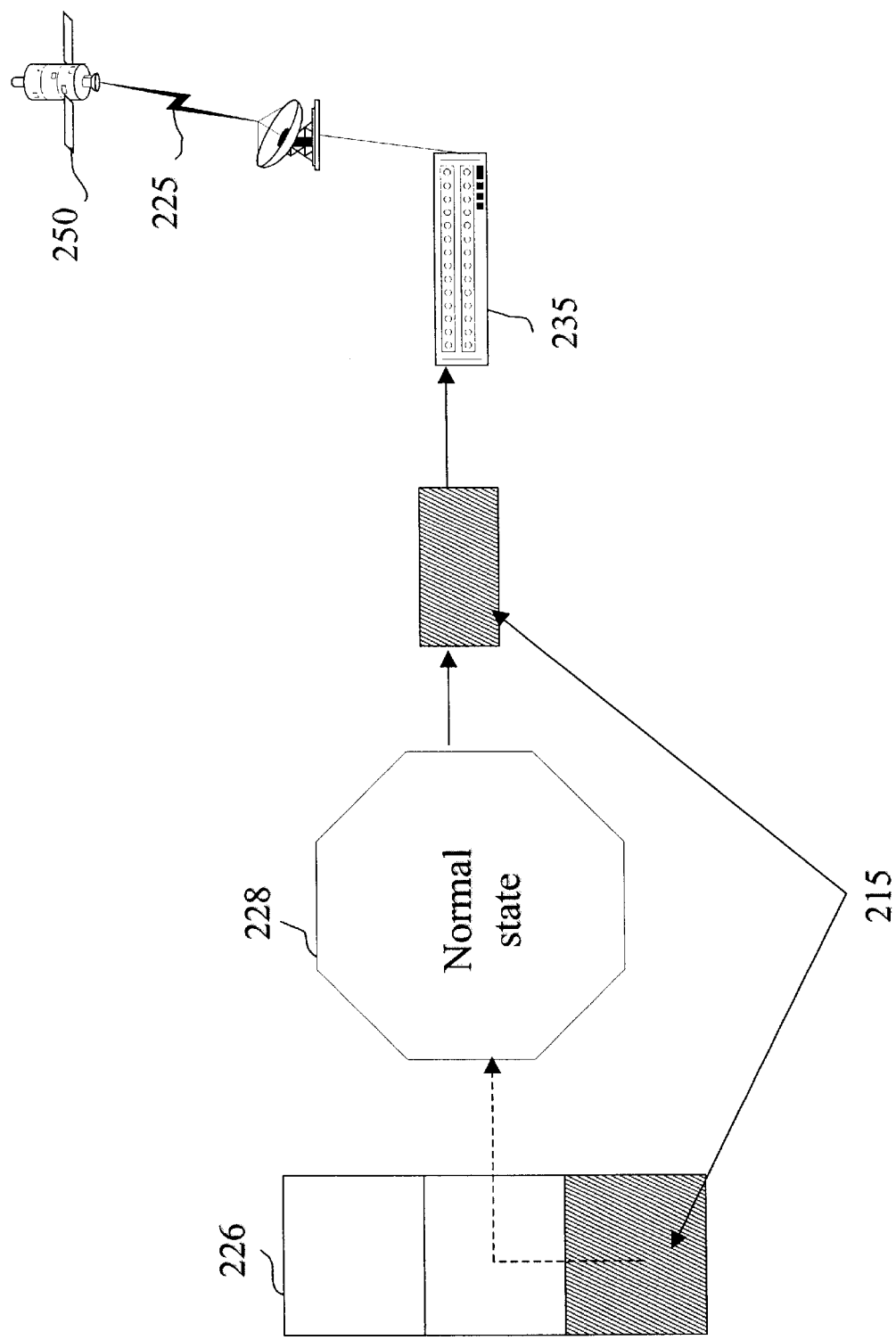
FIG. 4 depicts data flow when the send procedure is configured in a normal state.
Figure 5:
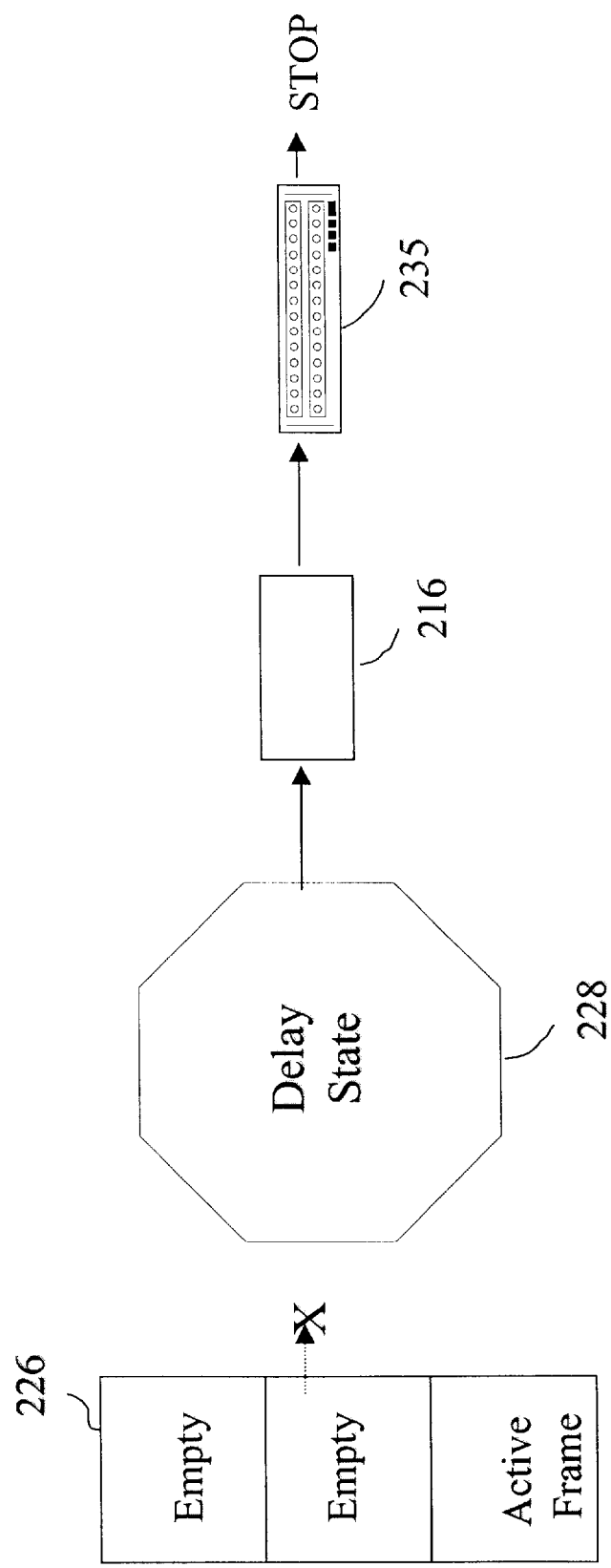
FIG. 5 illustrates data flow when the send procedure is in a delay state configuration.
Figure 6:
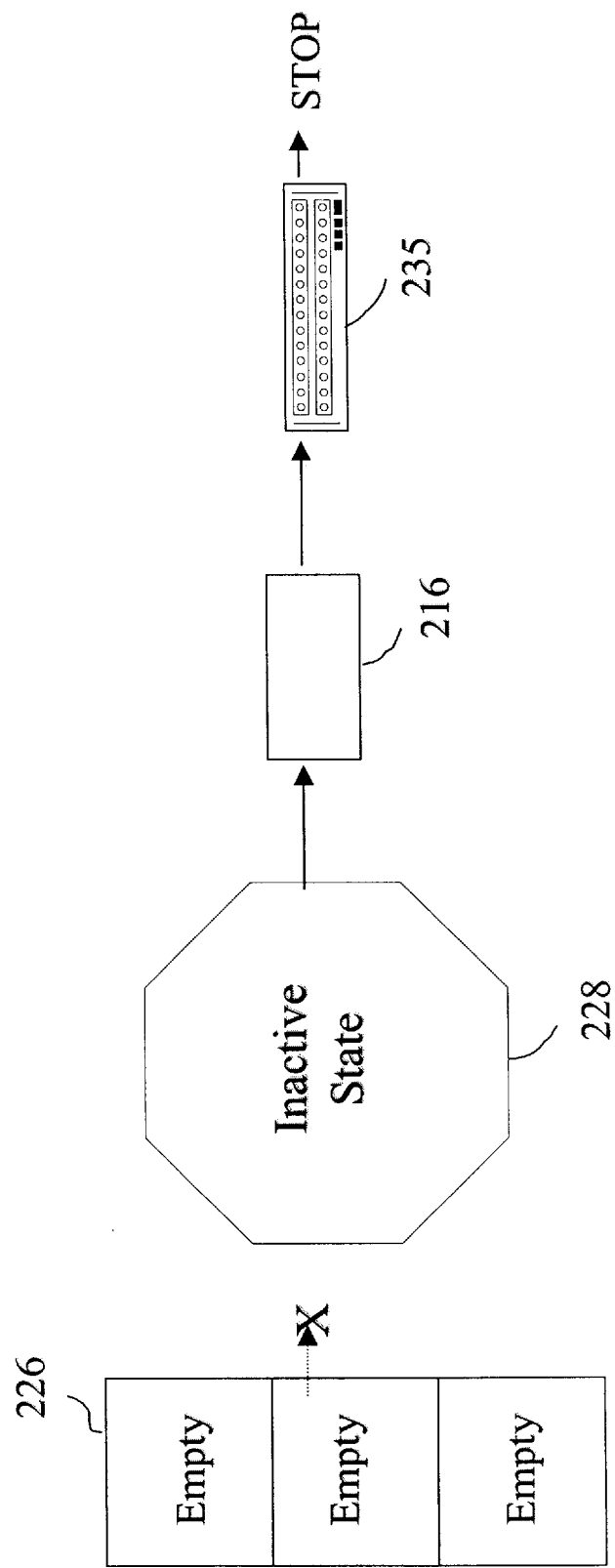
FIG. 6 illustrates data flow when the send procedure is in an inactive state configuration.

FIGS. 4–6 describe the implementation of transmission control of an exemplary four-user (hence 4-channel) satellite telephony system. In particular, FIGS. 4–6 focus on a portion of the DSP 222, that being the transmit buffer 226 and SP 228. FIG. 4 depicts the data flow when the send procedure is configured in the normal state; FIG. 5 illustrates a delay state configuration of the SP 228, and FIG. 6 illustrates an inactive state configuration of the SP 228.

FIG. 4 depicts the data flow when the send procedure is configured in the NORMAL state. In NORMAL state, the transmit buffer 226 has valid frame(s) 215 therein (frames with speech data). The SP 228 can send this frame 215 to the radio unit 235 and hence satellite link 245 as a valid frame. Thus, the radio unit 235 will transmit the frame 215 via antenna 240 and link 245 to satellite 250.

FIG. 5 illustrates data flow when the SP is in a DELAY state configuration. As soon as the SP 228 detects that the transmit buffer 226 is empty (more particularly, when it detects the absence of a frame and/or a dummy frame, since there still may be some valid frames in the buffer), it switches its configuration to the DELAY state. Additionally when transmit buffer 226 is declared empty or when a dummy frame is detected, SP 228 also initializes a counter (not shown) to zero. In this state, the SP 228 sends an invalid data frame 216 to the radio unit 235. Upon receiving the first word of invalid frame 216, the radio unit 235 stops transmitting (i.e., does not send the invalid frames toward satellite 250), such that the transmission burst is terminated. This saves satellite power.

K may represent the number of consecutive dummy and/or inactive frames between transmissions. K may also be described as the time (hence, number of consecutive dummy frames) between the end of a burst transmission and the transmitting of the next burst transmission, so that the satellite telephony system can achieve some measure of power savings. If there was no time between burst transmissions allocated, then there would be no power savings, since the satellite would in effect be in a near-constant transmitting state, taxing its limited transmit power.

Thus, the SP 228 continues to send invalid frames 216 (which are not transmitted by radio unit 235) as long as the counter value is less than K, and continues to increment the counter at each sending of the invalid frame 216. As long as the counter does not reach the value K, even if one or more new valid frames 215 are in the transmit buffer 226, the SP 228 does not change its state, but remains in the DELAY state, sending invalid frames 216. Any frames 215 (those with actual voice data therein) that are in the transmit buffer 226 remain there until the counter reaches the value K. The counter (more particularly the incremented count) may be part of the SP 228. The value of K is determined by a control algorithm that is part of the DSP code in DSP 222. K may be a fixed value; or, as demonstrated in greater detail below, a function of the number of active channels at any give time.

When the counter reaches K (value equal to the number of consecutive dummy and/or inactive frames), the SP 228 changes its state. If the transmit buffer 226 is still empty, the SP 228 will change its state to INACTIVE. However, if there are one or more frames in the transmit buffer 226, the SP 228 will change its state to NORMAL.

FIG. 6 illustrates an inactive state configuration of the SP 228. In the INACTIVE state, the transmit buffer 226 is empty; thus the SP 228 will continue to send invalid frames 216 to radio unit 235 until there is a valid frame 215 (frame with voice or speech data) in the transmit buffer 226. Similar to the DELAY state, the counter will continue to increment, and the invalid frames 216 will not be transmitted by the radio unit 235 to satellite 250. Once a valid frame 215 is in transmit buffer 226, the SP 228 will switch its configuration back to the NORMAL state, and burst transmission of the valid frames 215 via radio unit 235 and link 245 to the satellite 250 will be resumed.

Accordingly, if the counter reaches K with valid frames 215 in the transmit buffer 226, the SP 228 changes its state to NORMAL; but if there are no valid frames 215 in the transmit buffer 226, the SP 228 will change its configuration to INACTIVE. During the INACTIVE state, the transmit buffer 226 is empty and the SP 228 sends invalid frames 216 to the radio unit 235. As soon as a new valid frame 215 is in the transmit buffer 226, the SP 228 changes it state to NORMAL, resuming transmission to the satellite 250.

c. Algorithm Delay and VAD Efficiency.

The trade-off, or cost, of the power saving method described above is a possible increase in system delay. The maximum delay, $T_{MAX}$, that the above algorithm adds to the system may be given by:

$$T_{MAX} = (K-1) * \left(\frac{F_t}{N}\right). \quad (8)$$

VAD efficiency should be calculated for various scenarios. Efficiency is defined as the ratio of time that the radio does not transmit any RF toward the satellite during a broadcast transmission to the total transmission time. In this calculation, it is assumed that the rate of pulling data from transmit buffer 226 in DSP 222 by radio unit 235 is equal to the combined data rate of all the channels (in the exemplary embodiment this would be four channels), that is, when all four channels are active. However, this assumption may not always be correct. If the pulling data rate from transmit buffer 226 to radio unit 235 is higher than the combined data rate of all the channels, the efficiency of the system increases.

For example, assign M as the number of inactive channels, M=0, . . . N, where N is the total number of channels in the satellite telephony system. For M=0, the efficiency is zero (0%); for M=N, the efficiency is 100%. Accordingly, the efficiency of the VAD system for M=1 . . . N-1 can be represented by:

$$E_{(M,N)} = 100 * \frac{\left(\frac{K*F_t}{N} - (\tau 1 + \tau 2)\right)}{\left(\frac{N}{M} * K * \frac{F_t}{N}\right)} \quad (9)$$

An equivalent presentation of equation (9) can be arrived at by using the number of symbols that are transferred. For example, if S1 is the number of symbols in one frame time ($F_t/N$), and if S2 is the sum of the number of symbols in the preamble and postamble times ($\tau 1+\tau 2$), the efficiency of the VAD algorithm can be given by:

$$E_{(M,N,S1,S2)} = 100 * \left(\frac{(K*S1) - S2}{\frac{N}{M} * K * S1}\right) \quad (10)$$

The following Table 1 depicts results for maximum delay ($T_{MAX}$) of equation (8), as well as for VAD efficiency ($E_{(M,N, S1, S2)}$) from equation (10) above.

TABLE 1

| Total Channels (N) | Inactive Channels (M) | K | Max Delay $T_{MAX}$ msec | Efficiency ($E_{(M,N,S1,S2)}$) | Theoretical Eff. (P = $0.5^n$) |
|---|---|---|---|---|---|
| 2 | 1 | 3 | 20 | 27.20% | 50% |
| 3 | 1 | 3 | 13.333 | 18.13% | 33% |
| 3 | 2 | 3 | 13.333 | 36.26% | 66% |
| 4 | 1 | 3 | 10 | 13.60% | 25% |
| 4 | 2 | 3 | 10 | 27.20% | 50% |
| 4 | 3 | 3 | 10 | 40.80% | 75% |
| 2 | 1 | 4 | 30 | 32.60% | 50% |
| 3 | 1 | 4 | 20 | 22% | 33% |
| 3 | 2 | 4 | 20 | 44% | 66% |
| 4 | 1 | 4 | 15 | 16.30% | 25% |
| 4 | 2 | 4 | 15 | 32.60% | 50% |
| 4 | 3 | 4 | 15 | 49.20% | 75% |
| 2 | 1 | 5 | 40 | 36% | 50% |
| 3 | 1 | 5 | 27 | 24% | 33% |
| 3 | 2 | 5 | 2 | 48% | 66% |
| 4 | 1 | 5 | 20 | 18% | 25% |
| 4 | 2 | 5 | 20 | 36% | 50% |
| 4 | 3 | 5 | 20 | 54% | 75% |
| 2 | 1 | 6 | 50 | 38.40% | 50% |
| 3 | 1 | 6 | 33 | 25.60% | 33% |
| 3 | 2 | 6 | 33 | 51.20% | 66% |
| 4 | 1 | 6 | 25 | 19.20% | 33% |
| 4 | 2 | 6 | 25 | 38.40% | 50% |
| 4 | 3 | 6 | 25 | 57.60% | 75% |

These values were calculated for different values of S1, S2, N, M and K. Particularly, S1=234 and S2=320; and the frame rate $F_t$=20 msec. Additionally, VAD efficiency was compared to the theoretical efficiency P for the ideal case, where there is no preamble or postamble time (i.e., S2=0, no overriding time). Thus, for the calculation of theoretical efficiency in Table 1, P=M/N. Further, Equation (10) and Table 1 provide algorithm efficiency for given values of total channels N and inactive channels M that vary with time. The following calculates average efficiency of the entire satellite telephony system over time.

d. System VAD Average Efficiency.

To calculate the average VAD efficiency for the satellite telephony system, the following assumptions for channel activity are made:

(1) Each channel has probability of ½ (50%) of being in an inactive state, with the silence interval being relatively long, as compared to $F_t$ of 20 milliseconds.

(2) The channels (in the exemplary case, the four channels) are independent from one another; and (3) The probability that M channel of N total channels will be inactive is given by the Bernoulli formula:

P(N total channels, M channel(s) inactive)= (11)

$$C_n^m * \left(\frac{1}{2}\right)^M * \left(\frac{1}{2}\right)^{N-M} = C_n^m * \left(\frac{1}{2}\right)^N, \quad (11)$$

where $C_n^m = \left(\frac{n!}{m!*(n-m)!}\right)$

Accordingly, based on equations (10) and (11) above, the average VAD efficiency, $E_{VAD}$, for any choice of K and for any number of channels between 1 and 4 (in the exemplary case where N=4 channels) can be calculated as:

$$E_{VAD}(S1, S2, K, N) = \left(\frac{1}{2}\right)^N * \sum_{m=0 \text{ to } N} C_n^m * 100 * \left(\frac{(K*S1) - S2}{\frac{N}{M}*K*S1}\right), \quad (12)$$

$$\text{where } C_n^m = \left(\frac{n!}{m!*(n-m)!}\right).$$

Equations (8) and (12) offer the designer of the algorithm a relationship between the average VAD efficiency $E_{VAD}$(S1, S2,K,N) and the maximum delay $T_{MAX}$ for various values of K. Further, based on whatever cost function, or the desired tradeoff between efficiency and system delay, is used, an optimal K may be chosen. Accordingly, the following Table 2 depicts the results of Eqs. (8) and (12) for common preamble and postamble values conventionally used. For Table 2, S1=234, S2=320 and Ft=20 milliseconds.

TABLE 2

| Number Of Channels (N) | Value of K | Efficiency (%) $E_{VAD}$(S1,S2,K,N) | Maximum added delay $T_{MAX}$ |
|---|---|---|---|
| 1 | N/A | 50.0 | 0 |
| 2 | 3 | 38.5 | 20 ms |
| 2 | 4 | 41.3 | 30 ms |
| 2 | 5 | 43.0 | 40 ms |
| 2 | 6 | 44.2 | 50 ms |
| 3 | 3 | 32.8 | 13.3 ms |
| 3 | 4 | 37.2 | 20 ms |
| 3 | 5 | 39.5 | 26 ms |
| 3 | 6 | 41.3 | 33.3 ms |
| 4 | 3 | 30.05 | 10 ms |
| 4 | 4 | 34.85 | 15 ms |
| 4 | 5 | 37.75 | 20 ms |
| 4 | 6 | 39.85 | 25 ms |

Referring to equations (8), (9) and (12), and the above Table 2, the following conclusions may be drawn. First, the power saving method of the present invention can achieve an average VAD efficiency, $E_{VAD}$(S1,S2,K,N), of about 40%, with an added delay of only about 20 milliseconds (compare to 50% efficiency for a single channel). This is true even with the given values for preamble and postamble. Secondly, shortening the preamble and postamble time increases the VAD efficiency. Third, the power saving algorithm yields good power saving results (regarding efficiency, $E_{VAD}$(S1, S2,K,N)=40%, as compared to the current efficiency for a 4 channel satellite telephony system of about 6%) with little added delay. Finally, for each preamble and postamble, and for each number N of channels, here is a value of K which may be selected so as to obtain a desired efficiency ($E_{VAD}$ of about 40%) and an acceptable system delay ($T_{MAX}$ of about 20 msec).

As an example, take the case where there is a combined (S1+S2) equal to 320 symbols for preamble and postamble time. An optimal K may be chosen as follows:

| | | |
|---|---|---|
| (a) | For N = 2 | K = 3; |
| (b) | For N = 3 | K = 4; |
| (c) | For N = 4 | K = 5. |

Therefore, for a given cost function (in terms of delay and power saving) one can easily calculate the optimal K for each value of N. Accordingly, the power saving method of the invention is adaptive so that K may be changed as a function of N, the total number of channels in the satellite telephony system.

e. Examples.

FIGS. 7(a) to 7(c) illustrate the implementation of the algorithm for three specific cases. These figures depict a sequence of sequential frames which might be processed in the DSP 222 prior to transmission, for example. In each case, N=total number of channels, M=number of inactive channels, S1=234, S2=320, K=4 and $F_t$=20. Also in FIGS. 7(a) to 7(c), T represents a data transmit, S represents no data transmit (preamble and postamble is included in S), and the numerals 1 to 4 represent the channels. Further, and for convenience, the frames of the channels are consecutively numbered so as to facilitate understanding of how satellite power may be conserved while avoiding undue system delay.

In FIG. 7(a), N=2, M=1, K=4, channel 1 active, channel 2 is inactive. The maximum delay $T_{MAX}$ is equal to the time it takes to transmit 3 frames, since in this case K=4 and $T_{MAX}$ is accordingly K−1. The time it takes to transmit a single frame ($F_t$/N) is 20/2 or 10 msec; thus for three frames this gives a $T_{MAX}$=30 milliseconds.

Referring to FIG. 7(a), the first frame is transmitted, since channel 1 is active. The next channel is not active, so frame 2 is not transmitted and this begins the sending of inactive frames (beginning with frame 3) during $T_{MAX}$, as discussed above with reference to FIGS. 5 and 6. The counter also initializes and begins its count to K. Frames 3 and 5, corresponding to active channel 1, are not transmitted during this delay, but are essentially "held" in the transmit buffer 226 (recall DELAY state of FIG. 5) until the counter=K.

Thus at frame 6, (which is an inactive channel 2) frame 3 of the active channel 1 is transmitted; then at frame 7, frame 5 of active channel 1 is transmitted; at frame 8, the frame 7 of active channel 1 is transmitted, frame 9 is an active channel so it is transmitted, then at frame 10, channel 2 is inactive so this frame is not sent. Accordingly, the process repeats: the counter initializes and counts to K, the max delay of 3 frames runs where no frame data is transmitted, then when the counter reaches K transmission begins again as SP 228 shifts to NORMAL state (since transmit buffer 226 now contains a valid frame (frame 11). For FIG. 7(a), $E_{VAD}$(S1,S2,K,N)=32.6%.

In FIG. 7(b), N=3, M=1, K=4, channels 1 and 2 are active, and channel 3 is inactive. The maximum delay $T_{MAX}$ is 3 sub-frames, 20/3 milliseconds each, which gives a $T_{MAX}$=20 milliseconds. Similar to FIG. 7(a), the first two frames (channels 1 and 2 which are active) are transmitted. Channel 3 is not active, so frame 3 is not transmitted. As K=4, frames 3–6 are not transmitted (in particular frames 4 and 5 of active channels 1 and 2 are held in the buffer) until the counter reaches K (at frame 7).

Thus, at frame 7, frame 4 of the active channel 1 is transmitted; at frame 8 frame 5 of active channel 2 is transmitted; at frame 9, frame 7 of active channel 1 is transmitted, at frame 10, frame 8 of active channel 2 is transmitted; at frame 11, frame 10 of active channel 1 is transmitted; at frame 12, frame 11 of active channel 2 is transmitted (note at this point, all frames of previous active channels have now been transmitted); frames 13 and 14 are active channels so they are transmitted; then finally at frame 15, inactive channel 3 is sent to SP 228, stopping transmission as SP 228 shifts to the DELAY state. Like FIG. 7(a), the process repeats itself until the remainder of the frame data are processed. For FIG. 7(b), $E_{VAD}$=22.0%.

In FIG. 7(c), N=4, M=1, K=4, channels 1, 2 and 3 are active, and channel 4 is inactive. The maximum delay $T_{MAX}$ is 3 sub-frames, 5 milliseconds each, which gives a $T_{MAX}$=15 milliseconds. The iterative process is similar as described above for the N=4 channel case. For FIG. 7(c), $E_{VAD}$=16.3%

FIGS. 7(a) to 7(c) illustrate a trend in that, for a given preamble, postamble and K, efficiency is sacrificed for reduced system delay as the number of active channels increase. Of course, the method of the invention provides the designer of the algorithm the ability to adjust the average VAD efficiency ($E_{VAD}$) and the maximum delay $T_{MAX}$ for various values of K, dependent only on whatever cost function is desired. Further, and based on whatever tradeoff between efficiency and system delay is wanted, an optimal K may be chosen by the designer of the algorithm.

The invention being thus described, it will be obvious that the same may be varied in many ways. For example, the method has been described referencing a satellite telephony system having four (4) remote channels. However, the invention is not limited to such; the method is applicable to telephony system of N channels. Further, although the above described DSP 222 has been described as comprised of several components or blocks, it should be understood that the power saving VAD algorithm may be implemented in application specific integrated circuits, software-driven processor circuitry, propagated signal systems and/or other arrangements of discrete components. Such variations are not to be regarded as departure from the spirit and scope of the invention, and all such modifications as would be obvious to one skilled in the art are intended to be included within the scope of the following claims.

What is claimed is:

1. A method of comprising transmit power in a satellite telephony system having a least N remote channels transmitting frame data, comprising:
   storing frame data received from said remote channels in a buffer, wherein said remote channels are inactive and/or active; and
   determining whether frame data of any one of said N channels is to be transmitted by a radio unit, wherein only valid frames from said N remote channels are transmitted from the radio unit to a satellite;
   wherein said step of determining is based on a calculated average power saving efficiency, $E_{VAD}$ of the satellite telephony system.

2. The method of claim 1, wherein said average power saving efficiency, $E_{VAD}$, is calculated by the equation:

$$E_{VAd}(S1,S2,K,N)=$$

$$\left(\frac{1}{2}\right)^N * \sum_{m=0 \text{ to } N} C_n^m * 100 * \left(\frac{(K*S1)-S2}{\frac{N}{M}*K*S1}\right),$$

$$\text{where } C_n^m = \left(\frac{n!}{m!*(n-m)!}\right);$$

wherein S1 is the number of voice symbols in one frame time, S2 is the sum of the number of voice symbols of preamble and postamble times in a transmission, K is the time needed between the end of one burst transmission of frame data and the beginning of the next burst transmission of frame data in order to achieve some measure of power savings in the satellite telephony system, N is the total number of channels in the system, and $C_n^m$ represents a Bernoulli constant.

3. The method of claim 2, wherein K is chosen based on a desired tradeoff between system efficiency and system delay.

4. The method of claim 3, wherein $E_{VAD}$ for a total of N remote channels is about 40% with a system delay of about 20 milliseconds.

5. A method of conserving transmit power in a satellite telephony system having at least N remote channels transmitting frame data, comprising:
   storing frame data received from said remote channels in a buffer, wherein said remote channels are inactive and/or active; and
   determining whether frame data of any one of said N channels is to be transmitted by a radio unit, wherein only valid frames from said N remote channels are transmitted from the radio unit to a satellite,
   wherein transmission is terminated when it is determined that K consecutive inactive and/or dummy frames are in the buffer, and wherein transmission resumes after said K inactive and/or dummy frames have been sent to the radio unit but not transmitted to said satellite, and
   wherein K represents the time between the end of one burst transmission of frame data and the beginning of the next burst transmission of frame data in order to achieve some measure of power savings in the satellite telephony system.

6. The method of claim 5,
   wherein K is determined within a processor, and
   wherein K is a fixed value, or is determined as a function of the number of active channels in the satellite telephony system at any given time.

7. A method of conserving transmit power in a satellite telephony system having at least N remote channels transmitting frame data, comprising:
   storing frame data received from said remote channels in a buffer, wherein said remote channels are inactive and/or active; and
   determining whether frame data of any one of said N channels is to be transmitted by a radio unit, wherein only valid frames from said N remote channels are transmitted from the radio unit to a satellite;
   wherein said step of determining utilizes a send procedure to determine whether the buffer contains valid frames, dummy frames or is empty.

8. The method of claim 7,
   wherein said send procedure is in a normal state when it detects a valid frame in the buffer, enabling said processor to send said valid frame to said radio unit for transmission to said satellite;
   wherein said send procedure shifts to a delay state if it detects a dummy frame, said dummy frame being sent to said radio unit but not transmitted; and
   wherein said send procedure shifts to an inactive state if it detects an empty buffer, thereby sending inactive frames to said radio unit which are not transmitted.

9. The method of claim 8, wherein a count is initialized to zero when said send procedure is in said delay or inactive state and transmission is terminated, said count incrementing until reaching a predetermined value K, whereupon transmission of valid frames is resumed.

10. A satellite telephony system, comprising:
    a plurality of remote channels for transmitting voice data;
    a processor for converting said voice data into digital frame data, said processor accessing a buffer for storing frames representing said frame data, said frames being at least one of a valid and/or dummy frame; and
    a radio unit for transmitting frame data received from said processor to a satellite, wherein it is determined that only valid frames from said plurality of remote channels are transmitted from said radio unit to said satellite;
    wherein said processor determines transmission of valid frames based on an average power saving efficiency, $E_{VAD}$, of the satellite telephony system.

11. The system of claim 10, wherein said PROCESSOR calculates average power saving efficiency, $E_{VAD}$, by the equation:

$$E_{VAD}(S1,S2,K,N)=$$

$$\left(\frac{1}{2}\right)^N * \sum_{m=0 \text{ to } N} C_n^m * 100 * \left(\frac{(K*S1)-S2}{\frac{N}{M}*K*S1}\right),$$

$$\text{where } C_n^m = \left(\frac{n!}{m!*(n-m)!}\right);$$

wherein S1 is the number of voice symbols in one frame time, S2 is the sum of the number of voice symbols of preamble and postamble times in a transmission, K is the time needed between the end of one burst transmission of frame data and the beginning of the next burst transmission of frame data in order to achieve some measure of power savings in the satellite telephony system, N is the total number of channels in the system, and $C_n^m$ represents a Bernoulli constant.

12. The system of claim 11, wherein K is chosen based on a desired tradeoff between system efficiency and system delay.

13. The system of claim 12, wherein $E_{VAD}$ for a total of N remote channels is about 40% with a system delay of about 20 milliseconds.

14. A satellite telephony system, comprising:
a plurality of remote channels for transmitting voice data;
a processor for converting said voice data into digital frame data, said processor accessing a buffer for storing frames representing said frame data, said frames being at least one of a valid and/or dummy frame; and
a radio unit for transmitting frame data received from said processor to a satellite, wherein it is determined that only valid frames from said plurality of remote channels are transmitted from said radio unit to said satellite;
wherein said radio unit terminates transmission when said processor determines that K consecutive dummy and/or inactive frames are in the buffer,
wherein said radio unit resumes transmission said K inactive and/or dummy frames have been sent to the radio unit by the processor but not transmitted to said satellite, and
wherein K represents the time needed between the end of one burst transmission of frame data and the beginning of the next burst transmission of frame data in order to achieve some measure of power savings in the satellite telephony system.

15. The system of claim 14,
wherein K is determined within the processor, and
wherein K is a fixed value, or is determined as a function of the number of active channels in the satellite telephony system at any given time.

16. A satellite telephony system, comprising:
a plurality of remote channels for transmitting voice data;
a processor for converting said voice data into digital frame data, said processor accessing a buffer for storing frames representing said frame data, said frames being at least one of a valid and/or dummy frame; and
a radio unit for transmitting frame data received from said processor to a satellite wherein it is determined that only valid frames from said plurality of remote channels are transmitted from said radio unit to said satellite;
wherein said processor includes a send procedure therein to determine whether the buffer contains valid frames, dummy frames or is empty.

17. The system of claim 16,
wherein said send procedure is in a normal state when it detects a valid frame in the buffer, enabling said PROCESSOR to send said valid frame to said radio unit for transmission to said satellite;
wherein said send procedure shifts to a delay state if it detects a dummy frame, said dummy frame being sent to said radio unit but not transmitted; and
wherein said send procedure shifts to an inactive state if it detects an empty buffer, thereby sending inactive frames to said radio unit which are not transmitted.

18. The system of claim 17, wherein said send procedure further includes a counter which initializes to zero when said send procedure is in said delay or inactive state and transmission is terminated, said counter incrementing until reaching a pre-determined value K, whereupon transmission of valid frames is resumed by the radio unit.

19. A processor for a satellite telephony system having at least a radio unit transmitting and receiving voice data to and from a satellite, comprising:
a buffer for storing frames representing frame data which is received from a plurality of remote channels, said frames being at least one of a valid and a dummy frame; and
a send procedure circuit to determine whether the buffer contains valid frames, dummy frames or is empty, wherein only valid frames from said plurality of remote channels are pulled from said buffer by the processor to be transmitted by said radio unit to said satellite;
wherein said send procedure circuit is in a normal state when it detects a valid frame in the buffer, enabling the processor to send said the valid frame to said radio unit for transmission to said satellite;
wherein said send procedure circuit shifts to a delay state if it detects a dummy frame, said dummy frame being sent to said radio unit but not transmitted; and
wherein said send procedure circuit shifts to an inactive state if it detects an empty buffer, thereby sending inactive frames to said radio unit which are not transmitted.

20. The processor of claim 19,
wherein said send procedure circuit further includes a counter which initializes to zero when said send procedure circuit is in said delay or inactive state and transmission is terminated, said counter incrementing until reaching a pre-determined value K, whereupon the sending to and transmission of valid frames is resumed, and
wherein K represents the time needed between the end of one burst transmission of frame data and the beginning of the next burst transmission of frame data in order to achieve some measure of power savings in the satellite telephony system.

21. The processor of claim 20,
wherein if the processor determines that K consecutive dummy and/or inactive frames are in the buffer, said radio unit terminates transmission, and
wherein said radio unit resumes transmission said K inactive and/or dummy frames have been sent to the radio unit by the processor but not transmitted to said satellite.

* * * * *